Patented Oct. 12, 1943

2,331,375

UNITED STATES PATENT OFFICE 2,331,375

METHOD OF PREPARING A MONO-(BIGUA-NIDO) BENZENE MONOSULPHONAMIDE

Gaetano F. D'Alelio, Pittsfield, Mass., assignor to General Electric Company, a corporation of New York No Drawing. Application February 26, 1941, Serial No. 380,670

3 Claims. (Cl. 260—397.7)

This invention relates to a new and improved method of preparing a mono-(biguanido) benzene monosulphonamide. More particularly the invention is concerned with the method of preparing a mono-(biguanido) benzene monosulphonamide which comprises adding dicyandiamide to an aqueous solution of a salt selected from the class consisting of inorganic and carboxylic acid addition salts of a monoamino benzene monosulphonamide, heating the resulting solution until the corresponding salt of a mono-(biguanido) benzene monosulphonamide is formed, adding a base to the solution thereby obtained in an amount sufficient to form the said mono-(biguanido) compound, and isolating the said mono-(biguanido) compound from the said solution.

The present invention provides a method of preparing a mono-(biguanido) benzene monosulphonamide which comprises adding dicyandiamide to an aqueous solution of sulphanilamide hydrochloride, refluxing the resulting solution for a period of the order of three hours thereby to form in solution mono-(biguanido) benzene monosulphonamide hydrochloride, adding an alkali-metal hydroxide to the solution thereby obtained in an amount sufficient to form mono-(biguanido) benzene monosulphonamide, and crystallizing and separating the said mono-(biguanido) compound from the said solution.

My invention also provides a method of preparing mono-(biguanido) benzene monosulphonamide which comprises treating an aqueous solution of sulphanilamide with hydrochloric acid to form sulphanilamide hydrochloride, adding dicyandiamide to the resulting aqueous solution of sulphanilamide hydrochloride, the dicyandiamide and sulphanilamide being employed in the ratio of, by weight, 21 parts of the former to 43 parts of the latter, refluxing the resulting mixture for a period of the order of three hours thereby to form in solution mono-(biguanido) benzene monosulphonamide hydrochloride, adding an aqueous solution of sodium hydroxide to the solution thereby obtained in an amount sufficient to form impure crystals of mono-(biguanido) benzene monosulphonamide, and separating and purifying the impure crystals by recrystallization from a mixture of water and alcohol.

Illustrative examples of monoamino benzene monosulphonamides which, while admixed with an acid or in the form of their salts, may be caused to react with dicyandiamide to obtain a mono-(biguanido) benzene monosulphonamide as a final product are listed below:

Amino benzene sulphonamide
(Methyl amino) benzene sulphonamide
(Propyl amino) benzene sulphonamide
(Cyclohexyl amino) benzene sulphonamide
(Phenyl amino) benzene sulphonamide
(Benzyl amino) benzene sulphonamide
(Hydroxy-methyl amino) benzene sulphonamide
(Hydroxy-phenyl amino) benzene sulphonamide
(Hydroxy-naphthyl amino) benzene sulphonamide
(Hydroxy-cyclohexyl amino) benzene sulphonamide
(Chloro-phenyl amino) benzene sulphonamide
(Chloro-benzyl amino) benzene sulphonamide
Amino benzene (sulphonyl methyl amide)
Amino benzene (sulphonyl benzyl amide)
Amino benzene (sulphonyl phenyl amide)
Amino benzene (sulphonyl chloro-benzyl amide)
Amino benzene (sulphonyl chloro-phenyl amide)
Amino benzene (sulphonyl di-methyl amide)
Amino benzene (sulphonyl methyl ethyl amide)
Amino benzene (sulphonyl phenyl cyclohexyl amide)
(Methyl amino) benzene (sulphonyl di-methyl amide)
Amino chloro benzene sulphonamide
Amino hydroxy benzene sulphonamide
Amino methoxy benzene sulphonamide
Amino carboxy benzene sulphonamide
Amino carbomethoxy benzene sulphonamide I prefer to use an amino benzene sulphonamide as one of the starting reactants.

In practicing my invention a primary or a secondary amino benzene sulphonamide and cyanoiminourea are caused to react with each other by suitable means, for example in a solution containing an organic or an inorganic acid. Thus, I may add one mol of an organic or inorganic acid, e. g., hydrochloric acid, to a solution, specifically an aqueous solution, of 1 mol of a primary or secondary amino benzene sulphonamide, numerous examples of which have been given hereinbefore. This yields a solution of the corresponding salt of the amino benzene sulphonamide. One mol of dicyandiamide is added to the solution of the amino benzene sulphonamide salt and reaction is effected therebetween, for example by heating under reflux at the boiling temperature of the mass for a suitable period as, for instance, from 1 to 3 hours. The salt of the nuclearly poly-substituted benzene compound may be obtained by cooling the solution. Or, the nuclearly poly-substituted benzene compound may be obtained by adding to the solution the equivalent amount of a base, e. g., hydroxides and carbonates of the alkali metals, ammonia, amines, etc., in aqueous solution. If the salt is isolated from the reaction mass, it can be converted to the free base by dissolving it in a minimum amount of hot water and adding thereto an aqueous solution of the equivalent amount of a base such as alkali-metal hydroxide or carbonate, ammonia, amines, etc., thereby to precipitate the nuclearly poly-substituted benzene compound.

In carrying out the above-described reaction any organic or inorganic acid may be used, for example hydrochloric, hydrobromic, hydriodic, hydrofluoric, nitric, sulphuric, phosphoric, boric, selenic, chromic, formic, acetic, chloracetic, propionic, butyric, valeric, caproic, acrylic, polyacrylic, methacrylic, polymethacrylic, oxalic, malonic, succinic, glutaric, adipic, lactic, tartaric, citric, malic, maleic, fumaric, itaconic, citraconic, benzoic, phthalic, salicylic, camphoric, etc. Acid salts also may be employed, for instance zinc chloride, copper chloride, aluminum chloride, etc.

A more specific illustration of how my invention may be carried into effect is described below with specific reference to the production of mono-(biguanido) benzene monosulphonamide. All parts are by weight.

Twenty-four (24) parts hydrochloric acid are added to 43 parts sulphanilamide (p-aminobenzenesulphonamide) in 75 parts water. Twenty-one (21) parts dicyandiamide are now added and the mixture is refluxed for 3 hours. Ten (10) parts sodium hydroxide in 50 parts water are added to the reaction mixture and the free base, mono-(biguanido) benzene monosulphonamide, is allowed to crystallize from solution. The impure crystals are purified by recrystallization from alcohol and water. The purified mono-(biguanido) benzene monosulphonamide has a melting point of 184° to 185° C. with decomposition. The free base may be reconverted to organic or inorganic salts and complex compounds by treatment with organic or inorganic acids, or with acid salts, as described hereinbefore.

What I claim as new and desire to secure by Letters Patent of the United States is:

1. The method of preparing a mono-(biguanido) benzene monosulphonamide which comprises adding dicyandiamide to an aqueous solution of a salt selected from the class consisting of inorganic and carboxylic acid addition salts of a monoamino benzene monosulphonamide, heating the resulting solution until the corresponding salt of a mono-(biguanido) benzene monosulphonamide is formed, adding a base to the solution thereby obtained in an amount sufficient to form the said mono-(biguanido) compound, and isolating the said mono-(biguanido) compound from the said solution.

2. The method of preparing a mono-(biguanido) benzene monosulphonamide which comprises adding dicyandiamide to an aqueous solution of sulphanilamide hydrochloride, refluxing the resulting solution for a period of the order of three hours thereby to form in solution mon-(biguanido) benzene monosulphonamide hydrochloride, adding an alkali-metal hydroxide to the solution thereby obtained in an amount sufficient to form mono-(biguanido) benzene monosulphonamide, and crystallizing and separating the said mono-(biguanido) compound from the said solution.

3. The method of preparing mono-(biguanido) benzene monosulphonamide which comprises treating an aqueous solution of sulphanilamide with hydrochloric acid to form sulphanilamide hydrochloride, adding dicyandiamide to the resulting aqueous solution of sulphanilamide hydrochloride, the dicyandiamide and sulphanilamide being employed in the ratio of, by weight, 21 parts of the former to 43 parts of the latter, refluxing the resulting mixture for a period of the order of three hours thereby to form in solution mono-(biguanido) benzene monosulphonamide hydrochloride, adding an aqueous solution of sodium hydroxide to the solution thereby obtained in an amount sufficient to form impure crystals of mono-(biguanido) benzene monosulphonamide, and separating and purifying the impure crystals by recrystallization from a mixture of water and alcohol.

GAETANO F. D'ALELIO.